March 1, 1938.  R. URTEL  2,109,760
AMPLIFIER CIRCUIT SCHEME WITH PUSH-PULL OUTPUT
Filed Oct. 28, 1936
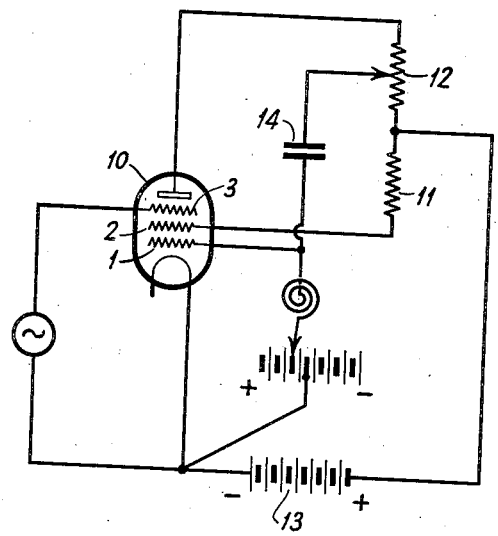
INVENTOR
RUDOLF URTEL
BY
ATTORNEY Patented Mar. 1, 1938

2,109,760

UNITED STATES PATENT OFFICE 2,109,760

AMPLIFIER CIRCUIT SCHEME WITH PUSH-PULL OUTPUT

Rudolf Urtel, Berlin, Germany, assignor to Telefunken Gesellschaft für Drahtlose Telegraphie m. b. H., Berlin, Germany, a corporation of Germany Application October 28, 1936, Serial No. 107,929
In Germany September 20, 1935

7 Claims. (Cl. 179—171)

There is known in the prior art an amplifier circuit arrangement with push-pull output wherein the two receiver halves or utilization circuits are arranged in the manner that the two terminals facing away from each other are connected to the plate and the space discharge grid, that is to two current-carrying electrodes of an amplifier tube, while the two terminals facing towards each other are connected over the plate potential source to the cathode of the tube. This known arrangement does not work satisfactorily to the extent that while the static characteristics for the currents of the two current-conveying electrodes as function of the potential at the control grid have equal steepness, the dynamic characteristics no longer show this property. For the reason that the internal resistance of space charge grid-cathode path is smaller than that of the plate-cathode path, the dynamic characteristic for the space discharge grid path has a flatter course than the one for the plate path.

For the elimination of these disadvantages the present invention provides an electrode disposed between the current-carrying electrode located nearer the cathode and the cathode itself, said electrode having an alternating potential being cophasal with the one appearing at the current-carrying electrode that is located farther away from the cathode. In other words, in order to obtain this result an alternating potential is applied to the additional grid in accordance with the invention, said potential being in phase with the potential existing at the current carrying electrode located at a greater distance from the cathode, that is, the anode.

An embodiment of the invention is shown in the drawing in diagrammatic manner. Therein 10 denotes a pentode to whose grid 2 and plate are connected the two binding posts facing away from each other of the split output circuit 11, 12 and whose cathode is connected through a plate potential source 13 with the binding posts of the two receiver halves facing each other. Grid 1 of the tube is connected through a blocking condenser to a tap of receiver half 12 while grid 3 is impressed with the control potential to be amplified. The elimination of above mentioned disadvantage is accomplished because the alternating potential at grid 1 is co-phasal with respect to the plate alternating potential of the tube and thus causes a decrease of the internal resistance of the plate path, while the potential at grid 1 is in phase opposition with respect to grid 2 and thus an increase occurs of the internal resistance between cathode and grid 2.

Condenser 14 in the lead to grid 1 has the purpose to keep away from grid 1 the direct-current potential which exists at the tap of receiver half 11. This condenser may also be substituted by a direct-current source whose negative pole points towards grid 1 and whose positive pole towards receiver half 12.

The alternating potential for grid 1 can also be obtained by transformer means. For this purpose a winding is inductively coupled with one of the two receiver halves and disposed between grid 1 and the cathode of the tube with due consideration of the pole signs. The poles of this winding are selected in their sense according to whether this winding is induced by one or the other of the two receiver halves.

What is claimed is:

1. In an input coupling system for a push-pull amplifier wherein said input system includes an electronic tube provided with an anode and a grid electrode used as output electrodes to form a push-pull output circuit for said tube, an input grid electrode, an auxiliary grid electrode and an electron emitting electrode and wherein signal energy to be amplified is impressed between the input grid electrode and the electron emitting electrode, the method of equalizing the outputs of the two sides of the push-pull output circuit of said electronic tube which method includes the step of feeding back to the auxiliary grid electrodes signal energy derived from one side of the push-pull circuit.

2. An input coupling system for a push-pull amplifier comprising an electronic tube having a pair of output electrodes, an input electrode, an auxiliary electrode and an electron emitting electrode, means for connecting a source of energy to be amplified between the input electrode and the electron emitting electrode, a push-pull output circuit for said tube including a pair of substantially like resistors connected in series between said output electrodes, a connection between a point of said last named connection common to said two series resistors and the electron emitting electrode, said connection including means for maintaining said output electrodes at a positive potential with respect to the electron emitting electrode, a feedback circuit connected between the auxiliary electrode and a point of one of said resistors, said feedback circuit being arranged to impress a signal voltage upon the auxiliary electrode which is in phase with signal voltage on one of the output electrodes and out of phase with signal voltage on the other output electrode.

3. In an input coupling system for a push-pull amplifier, an electronic tube having an anode, a cathode, an output grid, an auxiliary grid and a signal grid, a connection between said anode and said output grid, said connection including a pair of substantially like resistor elements in series, a connection between a point of the resistance element nearest the anode and said auxiliary grid, said last named connection including a condenser, means including a source of space current for connecting the cathode of said tube to a point of said first named connection which is common to the two resistance elements, a source of energy to be amplified connected between the signal grid and the cathode and means for connecting the auxiliary grid electrode to the cathode including a choke coil and a source of potential.

4. In combination with an electron discharge device having a cathode, an anode and three grid electrodes, said grid electrodes being interposed between the cathode and anode, an input circuit connected between one of said grids and the cathode, impedance means connected between the anode and another of said grids, a source of space current for said discharge device connected between the cathode and an intermediate point of said impedance means and a feedback circuit connected between a point of the impedance means and still another of said grids.

5. An arrangement as described in the next preceding claim characterized by that the feedback connection includes a coupling capacity.

6. An arrangement as described in the next to the next preceding claim further characterized by that the last named grid is connected to the cathode through a choke and means for maintaining said grid at a predetermined potential with respect to the cathode.

7. An input coupling system for a push-pull amplifier comprising in combination, an electronic tube having an anode, a cathode, an output grid, an auxiliary grid and a signal grid, said three grids being positioned intermediate the anode and cathode, a push-pull output circuit for said tube comprising a connection between the anode and the output grid, said connection including a pair of substantially similar resistor elements connected in series, a feedback connection between a point of the resistance element nearest the anode and the auxiliary grid, said last named connection including a coupling condenser, means including a source of space current for connecting the cathode of said tube to a point of the first named connection which is common to the two resistance elements, means for connecting the source of energy to be amplified between the signal grid and the cathode, said feedback circuit being arranged to impress a signal voltage upon the auxiliary electrode which is in phase with the signal voltage existing at the anode and out of phase with the signal voltage existing at the output grid, the voltage fed back through said feedback circuit being sufficient to equalize the outputs of the two sides of the push-pull output circuit.

RUDOLPH URTEL.